(12) United States Patent
Mills

(10) Patent No.: US 8,474,843 B2
(45) Date of Patent: Jul. 2, 2013

(54) SUSPENSION ASSEMBLY FOR WHEELED CONVEYANCE

(76) Inventor: Christopher James Mills, Oxford (GB)

( * ) Notice: Subject to any disclaimer, the term of this patent is extended or adjusted under 35 U.S.C. 154(b) by 0 days.

(21) Appl. No.: 13/261,389

(22) PCT Filed: Feb. 1, 2011

(86) PCT No.: PCT/EP2011/051370
§ 371 (c)(1),
(2), (4) Date: Aug. 27, 2012

(87) PCT Pub. No.: WO2011/098371
PCT Pub. Date: Aug. 18, 2011

(65) Prior Publication Data
US 2012/0313341 A1    Dec. 13, 2012

(30) Foreign Application Priority Data
Feb. 9, 2010    (GB) .................................. 1002074.1

(51) Int. Cl.
*B60G 3/12*    (2006.01)
(52) U.S. Cl.
USPC .................................................. 280/124.128
(58) Field of Classification Search
USPC ............ 280/124.128, 304.1, 647, 755, 250.1; 180/907
See application file for complete search history.

(56) References Cited

U.S. PATENT DOCUMENTS

| | | | |
|---|---|---|---|
| 2,606,021 A * | 8/1952 | Hexel | 267/275 |
| 2,784,963 A | 3/1957 | Whalen | |
| 3,741,579 A | 6/1973 | Kirsch | |
| 5,772,237 A * | 6/1998 | Finch et al. | 180/65.1 |
| 6,796,568 B2 * | 9/2004 | Martis et al. | 280/124.111 |
| 7,484,746 B2 * | 2/2009 | Mills | 280/124.128 |
| 2006/0151982 A1 | 7/2006 | Mills | |
| 2008/0083573 A1 * | 4/2008 | Tseng | 180/65.1 |
| 2012/0013098 A1 * | 1/2012 | Hart | 280/250.1 |

FOREIGN PATENT DOCUMENTS

| | | |
|---|---|---|
| DE | 820 541 C | 11/1951 |
| DE | 20 33 184 A1 | 1/1972 |
| EP | 1 513 479 B1 | 4/2006 |

* cited by examiner

*Primary Examiner* — Faye M. Fleming
(74) *Attorney, Agent, or Firm* — Ira S. Dorman

(57) ABSTRACT

A suspension assembly for a wheeled conveyance comprises suspension arms (1, 3) pivotally mounted on a chassis and extending in forward and rearward directions in the region of opposite sides of the chassis, each suspension arm (1, 3) having wheel receiving means (33) at the free end thereof. Spring means (7) is disposed in the region of each side of the chassis and acts between the forwardly and rearwardly extending suspension arms (1, 3) in such a way that the free ends thereof tend to pivot towards each other. Means (5) is provided for limiting movement of the suspension arms (1, 3) relative to each other. The limiting means (5) comprises a pair of limiter plates (17, 19) mounted on the chassis in opposite side regions thereof. The upper and lower suspension arms (1, 3) are pivotally mounted to the limiter plates in a region thereof remote from the spring means (7), the limiter plates (17, 19) restricting lateral movement of the suspension arms.

19 Claims, 7 Drawing Sheets

SUSPENSION ASSEMBLY FOR WHEELED CONVEYANCE

This invention relates to a suspension assembly for a wheeled conveyance, for example for improving the characteristics of the suspension assembly when the conveyance is stationary or travelling over a relatively even surface.

Wheeled conveyances, such as pushchairs, for use on rough ground are known, for example from GB-A-2 266 077, according to which spring means is used to urge the free ends of forwardly and rearwardly extending suspension arms towards each other, wheels for the conveyance being provided at the free ends of the suspension arms.

While such a wheeled conveyance works well when the suspension is in dynamic mode, that is when travelling over rough ground, it is preferable that any slack or lateral movement of the suspension should be eliminated, or at least reduced, when the suspension is in static mode, such as when the conveyance is stationary or travelling over a relatively even surface and, especially in the case of a pushchair, when a child is climbing into or out of the conveyance.

An arrangement has been proposed in EP-A-0 836 979 to limit such movement by providing a coil spring having a bolt extending axially within the spring and maintained in position by means of collets. However, a problem has been found with such an arrangement in that distortion, due to the forces encountered, and wear result in a non-sustainable reduction of slack or lateral movement.

It is therefore an object of the present invention to provide an alternative arrangement in a suspension assembly for a wheeled conveyance which overcomes, or at least further ameliorates, the above-described problems.

According to the present invention there is provided a suspension assembly for a wheeled conveyance, the assembly comprising: suspension arms pivotally mounted on a chassis and extending in forward and rearward directions in the region of opposite sides of the chassis, each suspension arm having wheel receiving means at the free end thereof; spring means disposed in the region of each side of the chassis and acting between the forwardly and rearwardly extending suspension arms in such a way that the free ends thereof tend to pivot towards each other; and means for limiting movement of the suspension arms relative to each other, wherein the limiting means comprises: a pair of limiter plates mounted on the chassis in opposite side regions thereof, the upper and lower suspension arms being pivotably mounted to the limiter plates in a region thereof remote from the spring means, the limiter plates restricting lateral movement of the suspension arms.

The limiter plates may be mounted on the chassis at the pivot points of the upper and lower suspension arms.

The limiter plates may be provided one at each end of a subframe forming part of the chassis.

The limiter plates may be provided, in the region of the spring means, with means, such as an arcuate slot engaged by pin means extending from each of the suspension arms, for limiting pivoting movement of the suspension arms. The limiting means may in particular limit movement of the suspension arms in a direction tending to increase the length of the spring. The limiting means may additionally limit movement of one or both of the suspension arms in a direction tending to compress the spring.

The limiter plates may each comprise first and second substantially parallel plates, one provided each side of the respective suspension arm. Each of the parallel plates may be provided with means for limiting pivoting movement of the suspension arms.

The wheeled conveyance may additional include means for locking the suspension arms relative to each other, the locking means comprising a first strut pivotably mounted on one of the upper and lower suspension arms of at least one pair of upper and lower suspension arms, and a second strut pivotably mounted on the other of the pair of suspension arms, the first and second struts being pivotably interconnected with each other, biasing means urging the first and second struts towards a substantially linear configuration in which the pair of suspension arms are locked relative to each other, and means for controlling the extent to which the first and second struts are movable by the biasing means towards the substantially linear configuration thereof.

The locking means may be provided for each pair of suspension arms.

The second strut may be pivotably mounted on the respective suspension arm by way of an elongate slot, for example extending in a longitudinal direction of the second strut.

The first strut may be mounted on the upper suspension arm and the second strut may be mounted on the lower suspension arm.

The biasing means may comprise a torsion spring, for example mounted about a pivot point between the first and second struts.

The control means may comprise a cable, for example connected to an operating lever mounted on the wheeled conveyance.

The operating lever may be movable between first and second positions, the first and second struts being movable to their linear configuration in the first position of the operating lever and being restrained from movement to the linear configuration in the second position of the operating lever.

The first and second struts of the locking means may be mounted on the suspension arms by way of the pin means.

For a better understanding of the present invention and to show more clearly how it may be carried into effect reference will now be made, by way of example, to the accompanying drawings in which.

Figure 1:
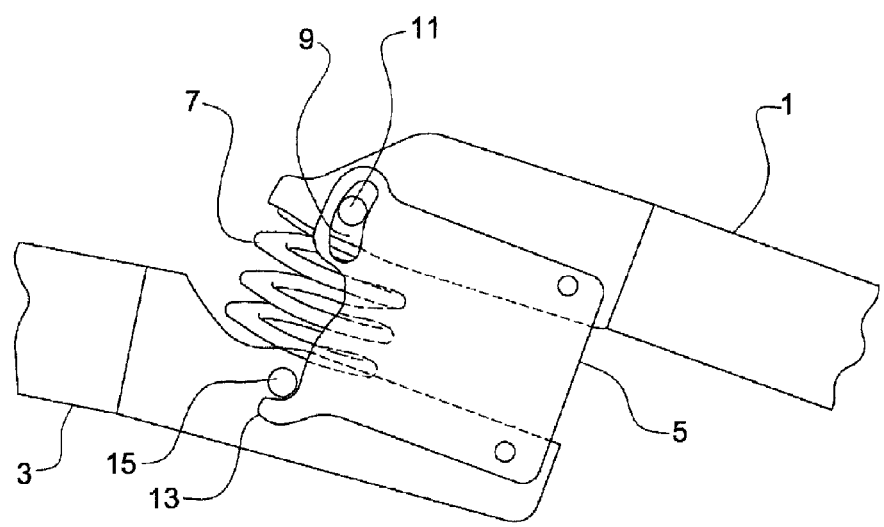
FIG. 1 is a side elevational view of part of a suspension assembly according to the present invention.

FIGS. 1 to 5 show part of a chassis of a wheeled conveyance, such as a push chair, comprising an upper suspension arm 1 and a lower suspension arm 3 which are mounted so as to be able to pivot relative to each other by means of a limiter plate 5, each suspension arm being pivotably mounted to the limiter plate which forms part of a chassis of the wheeled conveyance. The suspension arms extend forwardly and rearwardly with respect to the wheeled conveyance. A coil spring 7 urges the suspension arms apart such that the free ends of the suspension arms (not shown in FIGS. 1 to 5) are pivotally urged towards each other with the coil spring providing the suspension effect.

The suspension arms 1, 3 are pivotably mounted to the limiter plate 5 at locations spaced from the coil spring 7 such that relative movement of the suspension arms is able to compress the coil spring and to allow it to extend. In particular, the suspension arms are pivotably mounted to the limiter plate at the pivot points of the suspension arms relative to the chassis. The extent of movement of the suspension arms relative to each other is limited by the limiter plate 5 which is provided with an arcuate slot 9 engaged by a pin 11 extending from the upper suspension arm in a region thereof adjacent to the coil spring and with a protruding portion 13 which is engageable by a pin 15 extending from the lower suspension arm also in a region thereof adjacent to the coil spring. The arcuate slot limits pivoting movement of the upper suspension arm 1 in directions corresponding to compression and extension of the coil spring, while the protruding portion 13 limits pivoting movement of the lower suspension arm 3 in a direction corresponding to extension of the coil spring. Thus, in particular the limiter plate constrains movement of both suspension arms in a direction corresponding to extension of the coil spring. In addition, movement of the upper suspension arm is constrained in a direction corresponding to compression of the coil spring.

Figure 2:
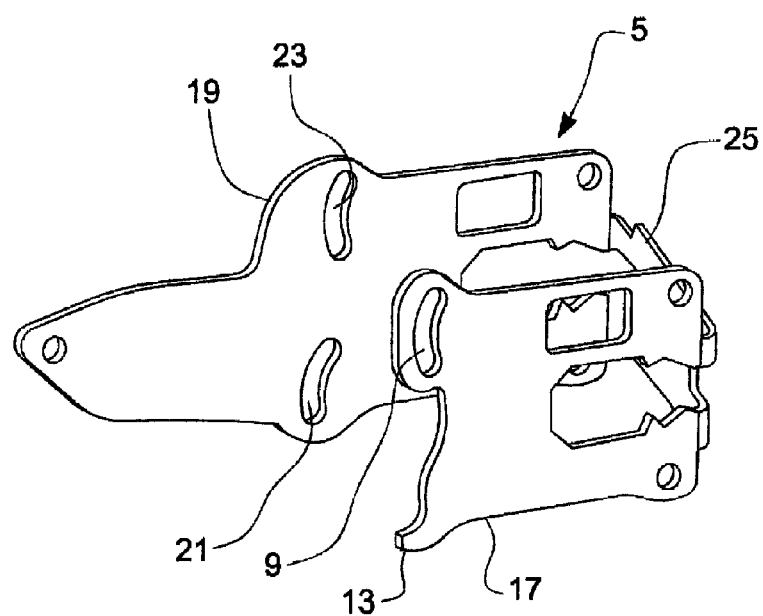
FIG. 2 is a perspective view of a limiter plate shown in FIG. 1.

However, as can be seen from FIG. 2 the limiter plate 5 includes two substantially parallel plate members 17, 19 which limit lateral movement of the suspension arms and, while there is a protruding portion 13 on the outer plate member 17, this is replaced by an arcuate slot 21 on the inner plate member 19. In contrast, there is a further arcuate slot 23 on the inner plate member 19 corresponding to the arcuate slot 9. The inner and outer plate members 17, 19 are interconnected by means of a bridging member 25. Thus, while the outer plate member constrains only movement of the upper suspension arm in a direction corresponding to compression of the coil spring, the inner plate member constrains movement of both suspension arms in a direction corresponding to compression of the coil spring.

Figure 3:
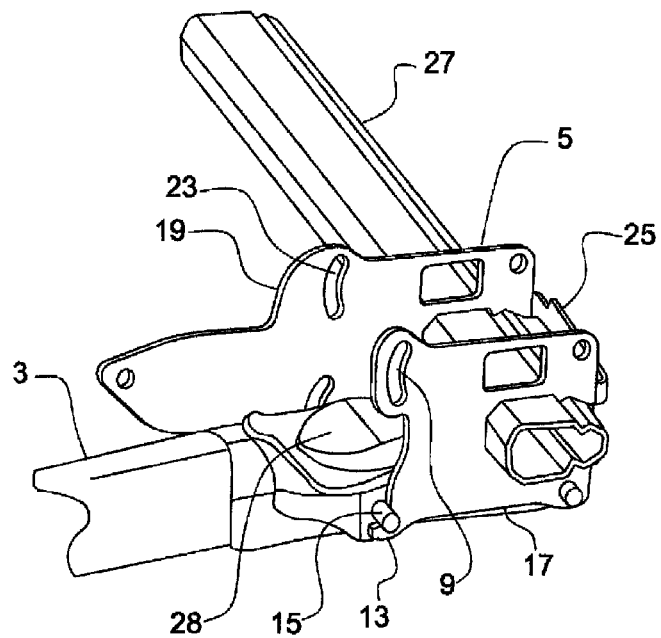
FIG. 3 is a perspective view of the limiter plate of FIG. 2 together with further components of the suspension assembly.
Figure 4:
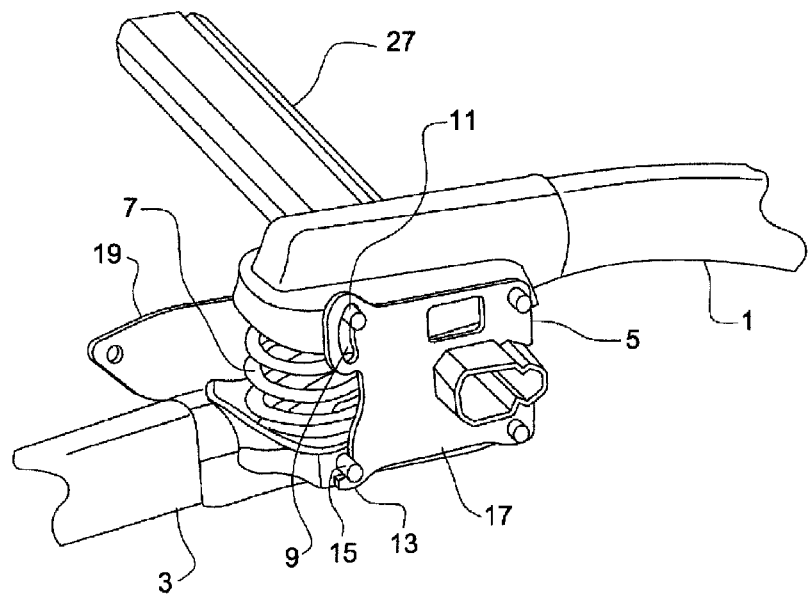
FIG. 4 is a view corresponding to FIG. 3 but with additional components of the suspension assembly.
Figure 5:
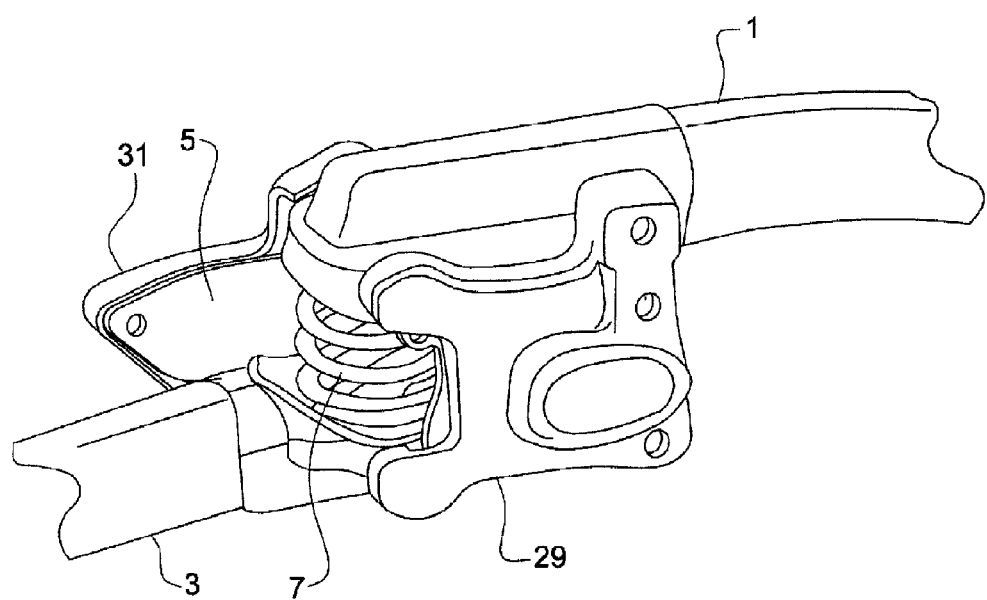
FIG. 5 is a view corresponding to FIG. 4 with cover plates for the limiter plate.

As shown in FIG. 3, a second set of upper and lower suspension arms, coil spring and limiter plate (not shown) is connected to the illustrated set by means of a subframe 27 which may be in the form of an extrusion. FIG. 3 also shows post 28 for receiving the coil spring 7 in order to maintain the coil spring in position. FIG. 4 shows the upper suspension arm and coil spring in position, while FIG. 5 shows the outer plate member 17 provided with an outer cover 29 and the inner plate member 19 provided with an inner cover 31. The outer and inner covers may be moulded from plastics material and may be provided with internal ribs to increase their strength and rigidity and with integral clips for fastening to the limiter plate 5.

Figure 6:
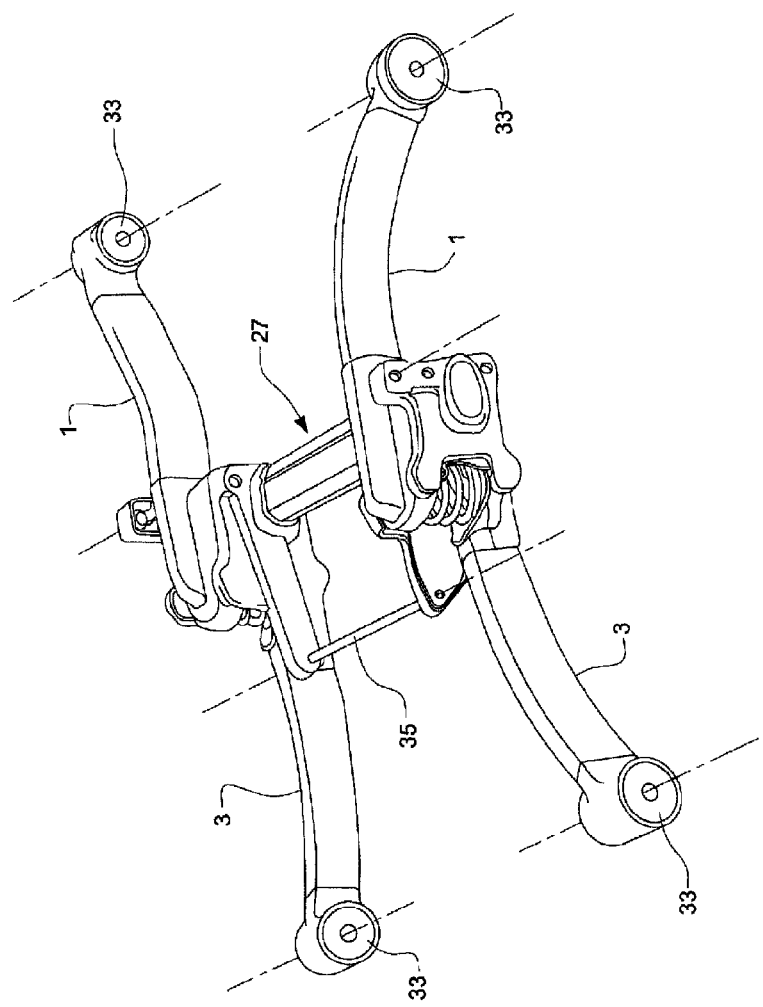
FIG. 6 is a perspective view of the major components of the suspension assembly.

FIG. 6 shows the major components of the suspension assembly including the two upper and two lower suspension arms with receiving means 33 for wheels of the wheeled conveyance at the free ends of the suspension arms. The chassis comprises the two limiter plates and the subframe and also includes a stabilising tie member 35 which extends between the two limiter plates 5 at a point remote from the subframe 27, the tie member extending parallel to the subframe. A push chair seat, for example, may be mounted on the subframe 27 and tie member 35. The slots 9, 21, 23 in the plate members 17, 19 act on the suspension arms 1, 3, by way of the pins 11, 15, to limit forward and/or rearward action of the suspension arms relative to the chassis.

Figure 7:
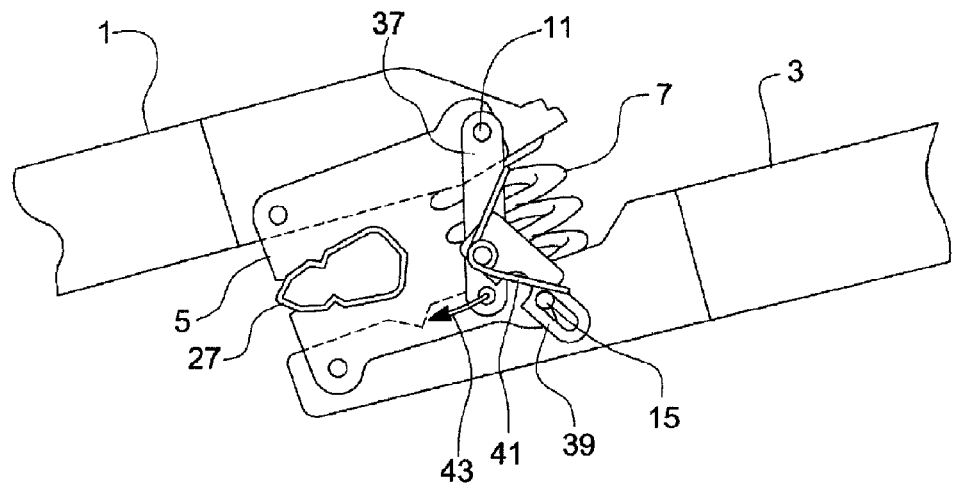
FIGS. 7, 8 and 9 show a lockout assembly for the suspension in three different configurations.
Figure 8:
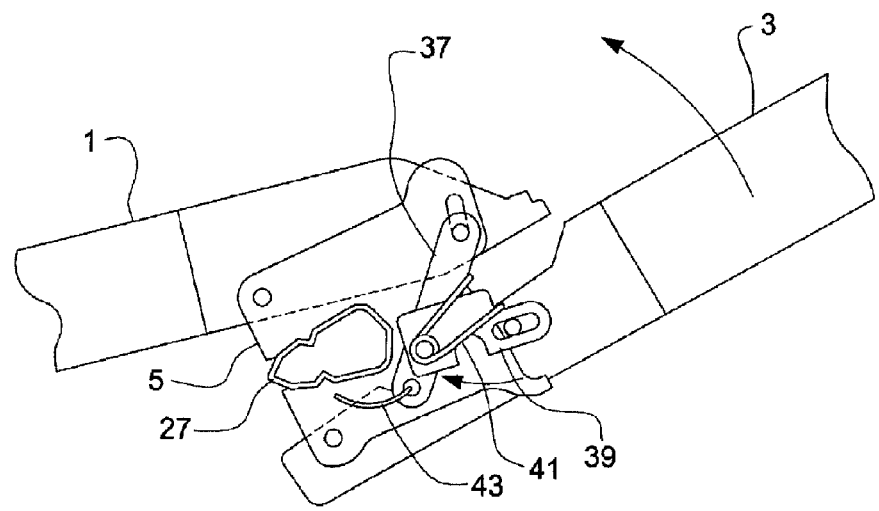
Figure 9:
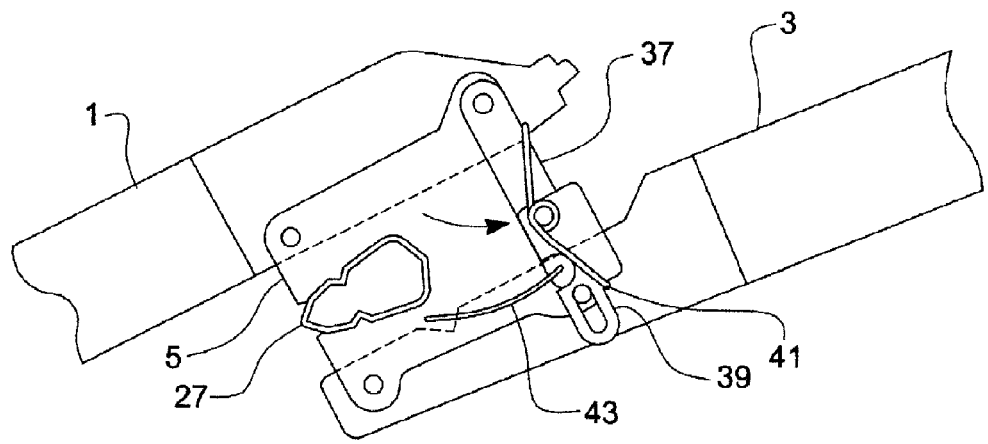
Figure 10:
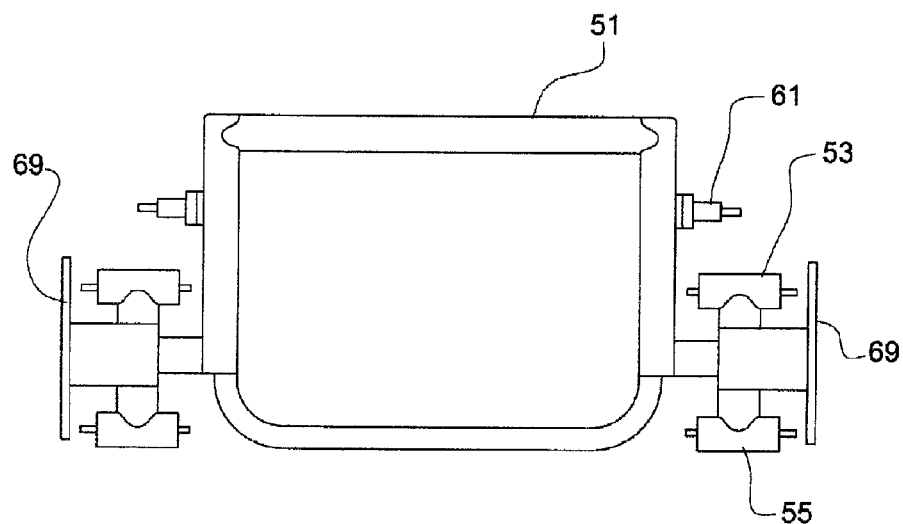
FIGS. 10 to 13 show part of a wheeled conveyance in the form of a wheelchair including a suspension assembly according to the present invention.
Figure 11:
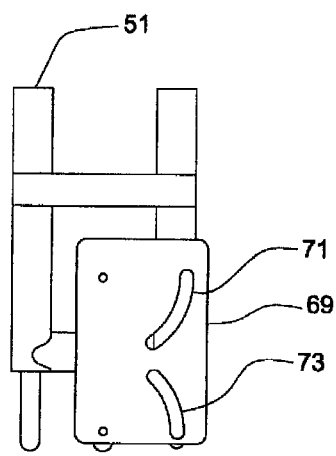

As shown in FIGS. 7 to 9, a lockout, or limiting, assembly is mounted on the outer face of each of the limiter plates 5 and is positioned between the limiter plate and the outer cover 29. The lockout assembly comprises first and second (upper and lower as illustrated) struts 37, 39 which are hinged together and are urged towards a substantially linear configuration as shown in FIG. 9 by a torsion spring 41. The first strut 37 is pivotally mounted at one end thereof to the pin 11 provided on the upper suspension arm 1 and is pivotally mounted to the second strut 39 towards the other end thereof. However, the first strut extends beyond the pivot point and the end of an operating cable, for example in the form of a Bowden cable 43, is secured to the free end of the first strut. The operation of the Bowden cable will be described in more detail hereinafter. The second strut 39 is pivotally mounted at one end thereof to the first arm and is mounted at the other end to the pin 15 provided on the lower suspension arm 3 by way of an elongate slot which extends in the longitudinal direction of the second strut. The second strut 39 is also formed with a cut-out portion to accommodate the fixing for the Bowden cable in the free end of the first strut 37.

In operation of the lockout assembly, the Bowden cable 43 from each lockout assembly is connected to an operating lever which is mounted on a handle of the wheeled conveyance (not shown) or other convenient location. For travelling over rough ground the cable is maintained in a taut condition as shown in FIGS. 7 and 8, while for travelling over relatively smooth surfaces, or when stationary, the cable is maintained in a slack condition as shown in FIG. 9.

In the taut condition of the cable 43, the first and second struts 37, 39 are unable to move to a linear configuration under the influence of the spring 41 due to the cable 43 restricting movement of the struts. FIG. 7 shows the configuration in a static situation, while FIG. 8 shows the suspension in operation. In FIG. 7 the struts 37, 39 are unable to move to a linear configuration due to the cable 43 and the pin 11 is at the upper end of the slot 9 in the limiter plate 5 with the pin 15 at the upper end of the slot in the second strut 39, while in FIG. 8 the suspension arms 1, 3 have pivoted relative to each other and the pin 11 is at the lower end of the slot 9 in the limiter plate 5 with the pin 15 at an intermediate position along the slot in the second strut 39 and the first and second struts are at a more acute angle relative to each other than in FIG. 7. Thus, the cable 43 is able to slacken in FIG. 8 compared with FIG. 7, but at no time is there sufficient slack to allow the first and second struts to move to a linear configuration.

In the slack condition of the cable 43 as shown in FIG. 9, there is sufficient slack in the cable 43 to allow the spring 41 to urge the first and second struts 37, 39 into a linear configuration where they are maintained. In this configuration, the pin 11 is at the upper end of the slot 9 in the limiter plate 5 and the pin 15 is at the upper end of the slot in the second strut 39 and, at the same time, is in engagement with the protrusion 13 of the limiter plate. The first and second struts 37, 39 are toggled together (that is, they are in a slightly over-centred configuration) and prevent the first and second suspension arms 1, 3 moving together, while the plate members 17, 19 and pins 11, 15 prevent the suspension arms moving in any other direction, such that the suspension is effectively locked. The suspension can, or course, be unlocked simply by adjusting the tension in the cable 43 by the operating lever (not shown).

The spring 41 is insufficiently strong to overcome the spring 7, but as soon as the suspension arms 1, 3 move to the position of FIG. 7 the spring 41 is able to straighten the first and second struts 37, 39 and to lock the suspension.

The wheeled conveyance shown in FIGS. 10 to 13 comprises a chassis 51 provided with an upper suspension arm 53 and a lower suspension arm 55 which are mounted so as to be able to pivot relative to each other. Each of the suspension arms has a wheel 57 mounted in the region of the free end thereof, with one or more motors 59 being provided for driving the wheels at the end of the upper suspension arm 53. A shock absorber 61 is provided, extending in a substantially horizontal direction so as to limit and dampen tilting of the chassis 51 relative to at least part of the suspension assembly, in particular the lower suspension arms 55, under dynamic load conditions, for example as explained in EP-A-1 513 479. A coil spring 63 urges the suspension arms apart such that the free ends of the suspension arms are pivotally urged towards each other with the coil spring providing the suspension effect.

Figure 12:
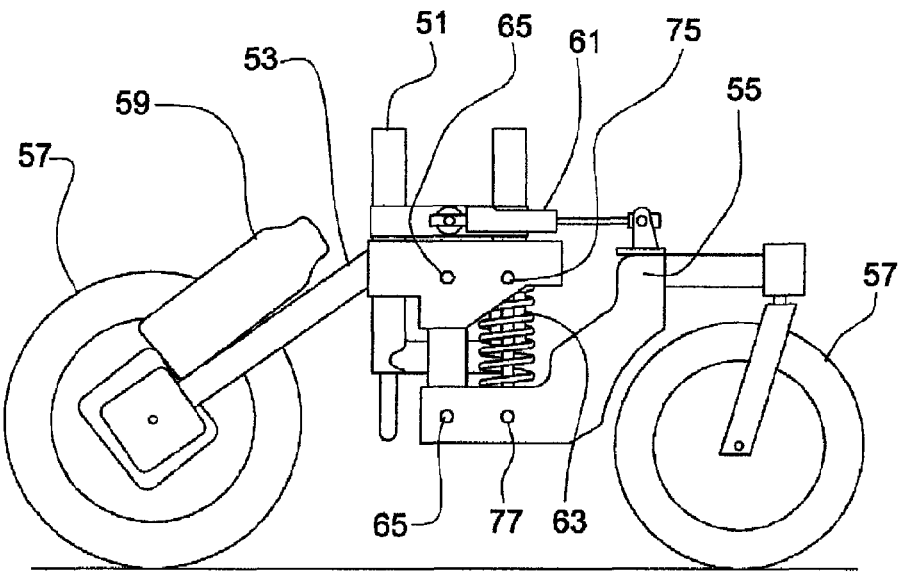

Thus as shown in FIG. 12, the upper suspension arm 53 is able to pivot relative to the chassis 51 at a point intermediate the ends thereof about an axis 65, while the lower suspension arm 55 is able to pivot relative to the chassis 51 in the region of an end thereof about an axis 67. The coil spring 63 is positioned between the region of the end of the upper suspension arm 53 and a region of the lower suspension arm intermediate the ends thereof.

A limiter plate 69 (omitted from FIG. 12 for clarity) is mounted at each side of the chassis 51 to constrain lateral movement of the suspension arms 53, 55. The limiter plates 69 are mounted externally of the suspension arms 53, 55.

Figure 13:
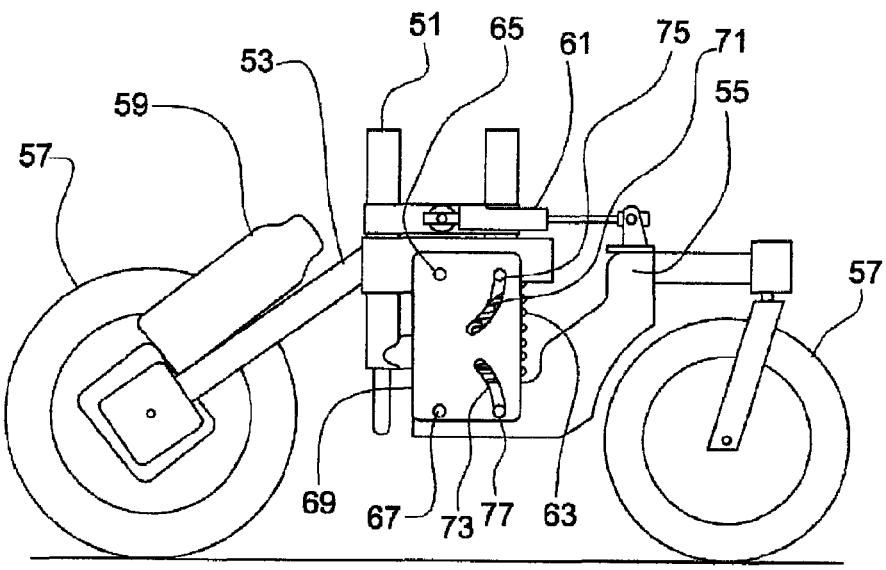

As can be seen by comparing FIGS. 12 and 13, each limiter plate is secured to the chassis 51 at the corresponding pivot points of the suspension arms 53, 55 and is provided with upper and lower arcuate slots 71, 73 which are engaged by pins 75, 77. An upper pin 75 is provided in the region of the end of the upper suspension arm 53 close to the coil spring 63 and engages with the upper arcuate slot 71, while a lower pin 77 is provided intermediate the ends of the lower suspension arm 55 in the region of the coil spring 63 and engages with the lower arcuate slot 73. Thus, in addition to constraining lateral movement of the upper and lower suspension arms 53, 55, the limiter plates 69, by way of the arcuate slots, also constrain pivoting movement of each of the suspension arms relative to the chassis and thus limiting movement apart due to the spring 63.

The lockout assembly forming part of the wheeled conveyance described in relation to FIGS. 7 to 9 may also be used as part of the wheeled conveyance of FIGS. 10 to 13.

The invention claimed is:

1. A wheeled conveyance including a suspension assembly comprising:
   (a) suspension arms (1, 3) pivotally mounted on a chassis and extending in forward and rearward directions in the region of opposite sides of the chassis, each suspension arm (1, 3) having wheel receiving means (33) at the free end thereof; spring means (7) disposed in the region of each side of the chassis and acting between the forwardly and rearwardly extending suspension arms (1, 3) in such a way that the free ends thereof tend to pivot towards each other; and means (5) for limiting movement of the suspension arms relative to each other, wherein the limiting means comprises: a pair of limiter plates (17, 19) mounted on the chassis in opposite side regions thereof, the upper and lower suspension arms being pivotably mounted to the limiter plates in a region thereof remote from the spring means, the limiter plates restricting lateral movement of the suspension arms; and
   (b) means (37, 39, 41, 43) for locking the suspension arms (1, 3) relative to each other, the locking means comprising a first strut (37) pivotably mounted on one of the upper and lower suspension arms of at least one pair of upper and lower suspension arms, and a second strut (39) pivotably mounted on the other of the pair of suspension arms, the first and second struts being pivotably interconnected with each other, biasing means (41) urging the first and second struts towards a substantially linear configuration in which the pair of suspension arms are locked relative to each other, and means (43) for controlling the extent to which the first and second struts are movable by the biasing means towards the substantially linear configuration thereof.

2. A wheeled conveyance as claimed in claim 1, wherein the limiter plates (17, 19) are mounted on the chassis at the pivot points of the upper and lower suspension arms (1, 3).

3. A wheeled conveyance as claimed in claim 1, wherein the limiter plates (17, 19) are provided one at each end of a subframe (27) forming part of the chassis.

4. A wheeled conveyance as claimed in claim 1, wherein the limiter plates (17, 19) are provided, in the region of the spring means (7), with means (9, 11) for limiting pivoting movement of the suspension arms (1, 3).

5. A wheeled conveyance as claimed in claim 4, wherein the means (9) for limiting pivoting movement comprises an arcuate slot (9) engaged by pin means (11) extending from each of the suspension arms (1, 3).

6. A wheeled conveyance as claimed in claim 4, wherein the limiting means (9, 11) limits movement of the suspension arms (1, 3) in a direction tending to increase the length of the spring (7).

7. A wheeled conveyance as claimed in claim 6, wherein the limiting means (9, 11) additionally limits movement of one or both of the suspension arms (1, 3) in a direction tending to compress the spring (7).

8. A wheeled conveyance as claimed in claim 1, wherein the limiter plates (17,19) each comprise first and second substantially parallel plates, one provided each side of the respective suspension arm (1, 3).

9. A wheeled conveyance as claimed in claim 8, wherein each of the parallel plates (17, 19) are provided with means (9, 11, 23) for limiting pivoting movement of the suspension arms (1, 3).

10. A wheeled conveyance as claimed in claim 1, wherein the locking means (37, 39, 41, 43) are provided for each pair of suspension arms (1, 3).

11. A wheeled conveyance as claimed in claim 1, wherein the second strut (39) is pivotably mounted on the respective suspension arm (1,3) by way of an elongate slot.

12. A wheeled conveyance as claimed in claim 11, wherein the elongate slot extends in a longitudinal direction of the second strut (39).

13. A wheeled conveyance as claimed in claim 1, wherein the first strut (37) is mounted on the upper suspension arm (1) and the second strut (39) is mounted on the lower suspension arm (2).

14. A wheeled conveyance as claimed in claim 1, wherein the biasing means (41) comprise a torsion spring.

15. A wheeled conveyance as claimed in claim 14, wherein the torsion spring (41) is mounted about a pivot point between the first and second struts (37, 39).

16. A wheeled conveyance as claimed in claim 1, wherein the control means (43) comprises a cable.

17. A wheeled conveyance as claimed in claim 16, wherein the cable (43) is connected to an operating lever mounted on the wheeled conveyance.

18. A wheeled conveyance as claimed in claim 17, wherein the operating lever is movable between first and second positions, the first and second struts (37, 39) being movable to their linear configuration in the first position of the operating lever and being restrained from movement to the linear configuration in the second position of the operating lever.

19. A wheeled conveyance as claimed in claim 1, wherein the limiter plates (17, 19) are provided, in the region of the spring means (7), with an arcuate slot (9) engaged by pin means (11) extending from each of the suspension arms (1, 3) for limiting pivoting movement of the suspension arms, and wherein the first and second struts (37, 39) of the locking means are mounted on the suspension arms (1, 3) by way of the pin means (11, 15).

* * * * *